United States Patent
Lee et al.

(10) Patent No.: US 11,473,725 B2
(45) Date of Patent: Oct. 18, 2022

(54) HIGH-PRESSURE GAS TANK AND METHOD FOR PRODUCING HIGH-PRESSURE GAS TANK

(71) Applicant: TOYOTA JIDOSHA KABUSHIKI KAISHA, Toyota (JP)

(72) Inventors: Sangkun Lee, Toyota (JP); Shinji Miyoshi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 262 days.

(21) Appl. No.: 16/786,153

(22) Filed: Feb. 10, 2020

(65) Prior Publication Data
US 2020/0271272 A1 Aug. 27, 2020

(30) Foreign Application Priority Data
Feb. 21, 2019 (JP) .............................. JP2019-029228

(51) Int. Cl.
*F17C 1/06* (2006.01)
*F17C 1/16* (2006.01)

(52) U.S. Cl.
CPC ............ *F17C 1/06* (2013.01); *F17C 1/16* (2013.01); *F17C 2201/0109* (2013.01); *F17C 2203/0604* (2013.01); *F17C 2203/066* (2013.01); *F17C 2203/0621* (2013.01); *F17C 2203/0663* (2013.01); *F17C 2221/012* (2013.01)

(58) Field of Classification Search
CPC combination set(s) only.
See application file for complete search history.

(56) References Cited

U.S. PATENT DOCUMENTS

| | | | |
|---|---|---|---|
| 2014/0131365 A1* | 5/2014 | Miyoshi | B29C 70/32 156/187 |
| 2018/0266627 A1 | 9/2018 | Ogiwara et al. | |
| 2019/0195429 A1* | 6/2019 | Ueda | B29C 70/32 |

FOREIGN PATENT DOCUMENTS

| | | |
|---|---|---|
| CN | 103620291 A | 3/2014 |
| JP | 2009-216133 A | 9/2009 |
| JP | 2011-106514 | 6/2011 |
| JP | 2013-160285 A | 8/2013 |
| JP | 2018-155337 A | 10/2018 |
| WO | WO 2013/001348 A2 | 1/2013 |

OTHER PUBLICATIONS

Toyota Motor Corp, TKO31557, Dec. 27, 2018 (pp. 223-224).

* cited by examiner

*Primary Examiner* — Don M Anderson
(74) *Attorney, Agent, or Firm* — Finnegan, Henderson, Farabow, Garrett & Dunner, LLP

(57) ABSTRACT

A high-pressure gas tank includes: a liner having an internal space for holding a gas; a strengthening layer stacked on the liner and having carbon fibers and a first resin; an intermediate layer stacked on at least a part of the strengthening layer; and a protective layer stacked on the intermediate layer and having glass fibers and a second resin. The intermediate layer has higher gas permeability than the strengthening layer and the protective layer.

20 Claims, 7 Drawing Sheets

HIGH-PRESSURE GAS TANK AND METHOD FOR PRODUCING HIGH-PRESSURE GAS TANK

INCORPORATION BY REFERENCE

The disclosure of Japanese Patent Application No. 2019-029228 filed on Feb. 21, 2019 including the specification, drawings and abstract is incorporated herein by reference in its entirety.

BACKGROUND

1. Technical Field

The disclosure relates to high-pressure gas tanks and methods for producing a high-pressure gas tank.

2. Description of Related Art

A tank including a liner having an internal space for storing a gas and a reinforcing layer formed so as to cover the liner and ensuring the strength of the tank against the internal pressure is known as a tank for storing and holding a high-pressure gas. Japanese Unexamined Patent Application Publication No. 2011-106514 (JP 2011-106514 A) discloses a configuration in which an innermost layer is formed between the liner and a shell body that is the reinforcing layer by winding fibers around the liner. In this configuration, hydrogen, which is a gas, having passed through the liner is retained in the innermost layer in order to restrain hydrogen from passing through the reinforcing layer located outside the innermost layer. The reinforcing layer is thus restrained from being damaged by the hydrogen having passed through the liner.

SUMMARY

However, the innermost layer formed by winding fibers around the liner has a larger degree of surface unevenness than the liner having a smooth surface. The inventors found that forming the reinforcing layer on the innermost layer having a larger degree of surface unevenness than the liner causes the following problem. When the reinforcing layer is formed on the innermost layer having a larger degree of surface unevenness than the liner, the shape of the reinforcing layer is changed by the uneven shape of the surface of the innermost layer. The reinforcing layer is therefore subjected to a local stress, and the strength of the reinforcing layer is reduced by the stress. Accordingly, a technique is desired which restrains reduction in strength of a gas tank and also restrains damage to the reinforcing layer due to hydrogen having passed through the liner.

The disclosure provides a high-pressure gas tank and a method for producing a high-pressure gas tank.

A first aspect of the disclosure relates to a high-pressure gas tank. The high-pressure gas tank includes: a liner having an internal space for holding a gas; a strengthening layer stacked on the liner and having carbon fibers and a first resin; an intermediate layer stacked on at least a part of the strengthening layer; and a protective layer stacked on the intermediate layer and having glass fibers and a second resin. The intermediate layer has higher gas permeability than the strengthening layer and the protective layer.

According to the first aspect, the gas having passed through the liner is spread in a plane direction, so that the gas is restrained from accumulating locally between the strengthening layer and the protective layer. This configuration restrains damage to the protective layer due to the gas having passed through the liner. Moreover, since the intermediate layer is formed between the strengthening layer and the protective layer, reduction in strength of the high-pressure gas tank due to the presence of the intermediate layer is restrained.

In the first aspect of the disclosure, the liner may include a cylinder portion and a pair of hemispherical dome portions located at both ends of the cylinder portion, and the intermediate layer may be formed over the cylinder portion.

With the above configuration, the intermediate layer is formed over the cylinder portion where the gas having passed through the liner is relatively less likely to move to the outside of the high-pressure gas tank through the protective layer, the gas is restrained from accumulating locally between the strengthening layer and the protective layer, and damage to the protective layer is restrained.

In the above aspect, the intermediate layer may be formed along entire circumference of the high-pressure gas tank. With this configuration, the gas having passed through the liner and then through the strengthening layer is spread in a circumferential direction in the intermediate layer. The gas is therefore restrained from accumulating locally between the strengthening layer and the protective layer, and damage to the protective layer is restrained.

In the above aspect, the intermediate layer may be formed so as to cover an entire surface of the liner. With this configuration, the gas is more effectively restrained from accumulating locally between the strengthening layer and the protective layer in the entire high-pressure gas tank.

In the above aspect, the intermediate layer may be made of a nonwoven fabric or foam. With this configuration, the gas having passed through the liner and then through the strengthening layer is spread in the plane direction in the intermediate layer comprised of the nonwoven fabric or the foam.

In the above aspect, the intermediate layer may be made of a fiber reinforced plastic layer.

In the above aspect, the intermediate layer may be formed continuously with the strengthening layer by using the carbon fibers or may be formed continuously with the protective layer by using the glass fibers.

In the above aspect, the intermediate layer may be formed in an area other than an area where a winding end is formed, the winding end being an end of winding of the glass fibers in the protective layer.

In the above aspect, the intermediate layer may have a higher gas diffusion rate in the plane direction than the strengthening layer and the protective layer, the plane direction being a direction parallel to the surface of the liner.

In the above aspect, the gas diffusion rate in the plane direction of the intermediate layer may be 100 Pa/s or higher.

In the above aspect, the high-pressure gas tank may further include a resin layer formed on the protective layer. The resin layer may be made of the same kind of resin as the second resin.

A second aspect of the disclosure relates to a method for producing a high-pressure gas tank. The method for producing a high-pressure gas tank includes: preparing a liner having an internal space for holding a gas; forming on the liner a strengthening layer having carbon fibers and a first resin; forming an intermediate layer on at least a part of the strengthening layer; forming on the intermediate layer a protective layer having glass fibers and a second resin; curing the first resin of the strengthening layer and the second resin of the protective layer to form a pre-tank; and filling the pre-tank with a fluid having a pressure higher than a predetermined maximum operating pressure of the high-pressure gas tank to pressurize the pre-tank, and thus finishing the high-pressure gas tank. The intermediate layer after the pressurization has higher gas permeability than the strengthening layer and the protective layer.

In the second aspect, the liner may include a cylinder portion and a pair of hemispherical dome portions located at both ends of the cylinder portion. The intermediate layer may be formed over the cylinder portion.

In the above aspect, the intermediate layer may be formed along entire circumference of the high-pressure gas tank.

In the above aspect, the intermediate layer may be formed so as to cover an entire surface of the liner.

In the above aspect, the method for producing a high-pressure gas tank may further include curing the second resin to form a resin layer on the protective layer.

In the above aspect, the intermediate layer may be made of a nonwoven fabric or foam.

In the above aspect, the intermediate layer may be made of a fiber reinforced plastic layer.

In the above aspect, the intermediate layer may be formed continuously with the strengthening layer by using the carbon fibers or may be formed continuously with the protective layer by using the glass fibers.

In the above aspect, the intermediate layer may be formed in an area other than an area where a winding end is formed, the winding end being an end of winding of the glass fibers in the protective layer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment (A-1) Overall Configuration of High-Pressure Gas Tank

Figure 1:
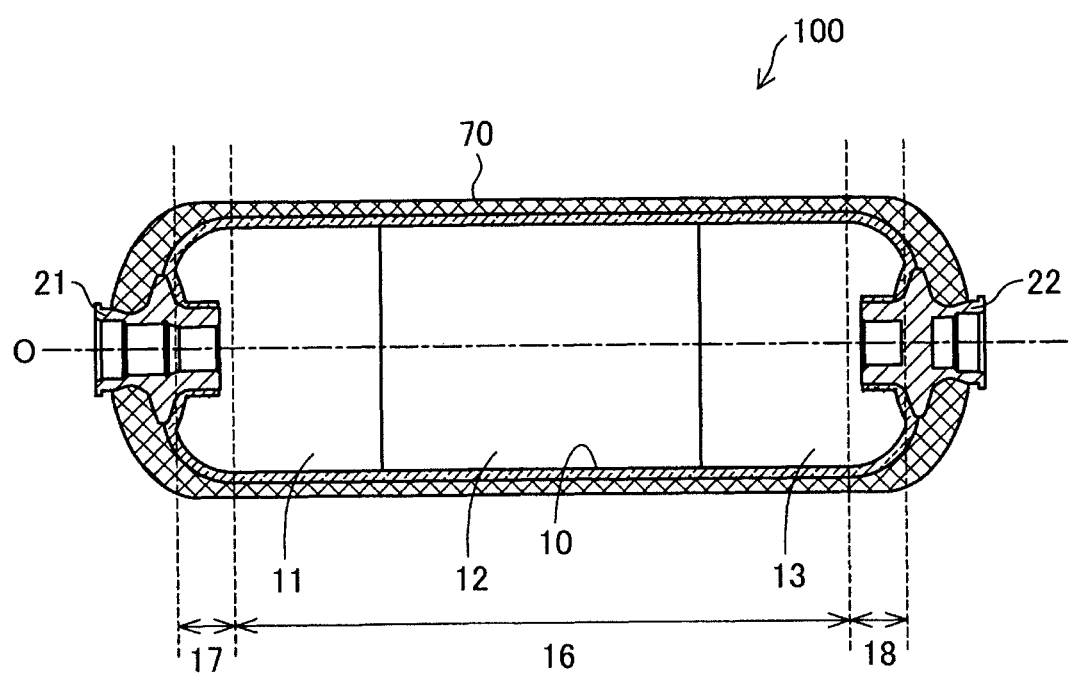
FIG. 1 is a schematic sectional view of a high-pressure gas tank.

FIG. 1 is a schematic sectional view of a high-pressure gas tank 100 according to an embodiment of the disclosure. The high-pressure gas tank 100 is a tank that stores a high-pressure gas. In the present embodiment, the high-pressure gas tank 100 stores compressed hydrogen as the high-pressure gas and is mounted on, e.g., a fuel cell vehicle equipped with a fuel cell that uses hydrogen as a fuel gas. The high-pressure gas tank 100 includes a liner 10, a reinforcing layer 70, and caps 21, 22.

The liner 10 has an internal space for holding a high-pressure gas. The liner 10 includes a cylinder portion 16 and two substantially hemispherical dome portions 17, 18. The cylinder portion 16 is a portion extending in the direction of an axis O and formed into a cylindrical shape, and the dome portions 17, 18 are located at both ends of the cylinder portion 16 and are continuous with the cylinder portion 16. The liner 10 of the present embodiment is made of a polyamide resin. Examples of the polyamide resin forming the liner 10 include nylon 6, nylon 66, nylon 610, nylon 612, nylon 11, and nylon 12. In the present embodiment, the liner 10 is made of nylon 6.

In the present embodiment, the liner 10 is formed by joining a plurality of members. Specifically, the liner 10 includes liner members 11, 12, 13. The liner members 11, 12, 13 are arranged in this order in the direction of the axis O. The liner members 11, 12 and the liner members 12, 13 can be joined by, e.g., a method such as infrared welding, laser welding, hot plate welding, vibration welding, or ultrasonic welding. The liner 10 may be comprised of a plurality of members other than three members and may be formed by a method different from joining a plurality of members, such as forming the entire liner 10 as a single-piece member. The caps 21, 22 are disposed in the top parts of the dome portions 17, 18 of the liner 10. The caps 21, 22 are joined to the liner member 11 or the liner member 13 by, e.g., insert molding.

The reinforcing layer 70 is formed so as to cover the outer surface of the liner 10. The reinforcing layer 70 reinforces the liner 10 to improve the strength of the high-pressure gas tank 100, specifically the strength of the high-pressure gas tank 100 mainly against the tank internal pressure. The reinforcing layer 70 includes a CFRP layer 74, a gas diffusion layer 73, a GFRP layer 72, and a resin layer 71. The high-pressure gas tank 100 of the present embodiment is characterized in that the reinforcing layer 70 has the gas diffusion layer 73 between the CFRP layer 74 and the GFRP layer 72. The reinforcing layer 70 will be described in more detail.

Figure 2:
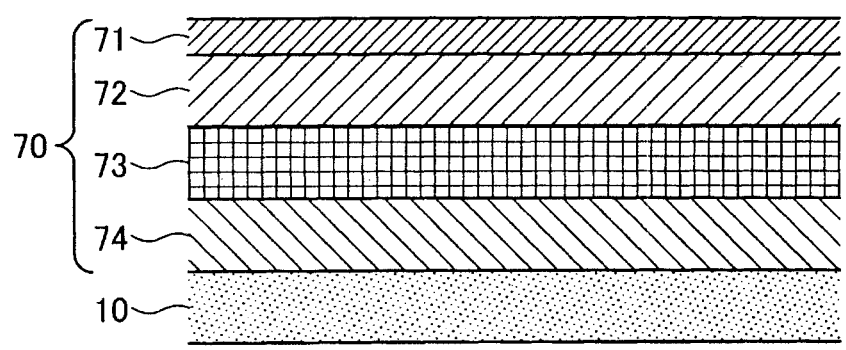
FIG. 2 is a partial enlarged schematic section of an outer wall of the high-pressure gas tank.

FIG. 2 is a partial enlarged schematic section of an outer wall of the high-pressure gas tank 100. The reinforcing layer 70 is formed by stacking the CFRP layer 74, the gas diffusion layer 73, the GFRP layer 72, and the resin layer 71 in this order from the liner 10 side toward the outer peripheral side of the high-pressure gas tank 100. The CFRP layer 74 and the GFRP layer 72 are layers made of fiber reinforced plastic (FRP) that is comprised of fibers wound around the liner 10 and resin with which the fibers are impregnated. Specifically, the CFRP layer 74 and the GFRP layer 72 are layers formed by winding long fibers impregnated with resin around the liner 10 by filament winding (hereinafter referred to as the "FW process") and then curing the resin. Although the reinforcing layer 70 has fine cracks etc. as described later, these cracks etc. are not shown in FIG. 2.

The CFRP layer 74 is a layer containing carbon fiber reinforced plastic (CFRP). The function of the reinforcing layer 70 to ensure that the high-pressure gas tank 100 has sufficient strength (strength against the tank internal pressure) is mainly performed by the CFRP layer 74. The CFRP layer 74 of the present embodiment includes a hoop layer and a helical layer as layers formed by winding carbon fibers impregnated with resin around the liner 10. The hoop layer is a layer formed by hoop-winding the carbon fibers, and the helical layer is a layer formed by helically winding the carbon fibers. "Hoop winding" is a winding method in which fibers are wound substantially perpendicularly to the direction of the axis O and is used to cover the outer periphery of the cylinder portion 16 of the liner 10. "Helical winding" is a winding method in which fibers are wound at an angle that is more tilted with respect to the direction of the axis O than in hoop winding and is used to cover the outer peripheries of the dome portions 17, 18 in addition to the outer periphery of the cylinder portion 16 of the liner 10. The number of hoop and helical layers forming the CFRP layer 74 and the order in which the hoop and helical layers are stacked can be changed as desired. The CFRP layer 74 is formed so as to cover the entire surface of the liner 10. The CFRP layer 74 is also referred to as a "strengthening layer."

The GFRP layer 72 is a layer containing glass fiber reinforced plastic (GFRP). A main function of the GFRP layer 72 is to protect the inside of the high-pressure gas tank 100 from physical or chemical stimuli that are applied from the outside to the surface of the high-pressure gas tank 100. That is, the GFRP layer 72 restrains the underlying layers such as the CFRP layer 74 from being physically damaged and restrains any chemical substance etc. from entering the reinforcing layer 70. Like the CFRP layer 74, the GFRP layer 72 can be formed by stacking a desired number of hoop and helical layers in a desired order. The hoop layer is a layer formed by hoop-winding glass fibers impregnated with resin, and the helical layer is a layer formed by helically winding glass fibers impregnated with resin. In the present embodiment, the outermost layer of the GFRP layer 72 is a hoop layer, so that sufficient tension is easily applied when the glass fibers are wound around the liner 10, and the surface of the GFRP layer 72 is smoothed. The GFRP layer 72 is formed so as to cover the entire surface of the liner 10. The GFRP layer 72 is also referred to as a "protective layer."

Examples of the resin contained in each of the layers forming the CFRP layer 74 and the GFRP layer 72 include thermosetting resins such as an epoxy resin and thermoplastic resins such as a polyester resin and a polyamide resin. The resin contained in the CFRP layer 74 is also referred to as a first resin, and the resin contained in the GFRP layer 72 is also referred to as a second resin. In the present embodiment, an epoxy resin is used as the first resin and the second resin. The first resin and the second resin may be either of the same kind or of different kinds. When the first resin and the second resin are of the same kind, properties of the resin may be varied by adding a curing accelerator or a strengthening agent, or when adding a curing accelerator or a strengthening agent, by varying the kind or amount of the curing accelerator or the strengthening agent.

The gas diffusion layer 73 is a layer having higher gas permeability than the CFRP layer 74 and the GFRP layer 72. Especially in the present embodiment, the gas diffusion layer 73 has a higher gas diffusion rate in a direction parallel to the surface of the liner 10 (hereinafter also referred to as the plane direction) than the CFRP layer 74 and the GFRP layer 72. The gas diffusion rate in the plane direction of the gas diffusion layer 73 is 100 Pa/s or higher. In the gas diffusion layer 73, the gas diffuses in the thickness direction of the gas diffusion layer 73 as well. In the present embodiment, however, the gas diffusion rate in the plane direction is used as an index indicating the extent to which the gas is spread in the plane direction between the CFRP layer 74 and the GFRP layer 72. The gas diffusion rate of each of the layers forming the reinforcing layer 70 and a method for measuring the gas diffusion rate will be described in detail later.

For FRP layers such as the CFRP layer 74 and the GFRP layer 72, the higher their gas permeability is, the lower their strength as an FRP layer tends to be and the easier it is for various substances including gas to pass through them. Accordingly, as described above, layers whose gas diffusion rate in the plane direction is 100 Pa/s or higher are not conventionally used as the CFRP layer 74 that mainly ensures the strength of the high-pressure gas tank 100 and the GFRP layer 72 that is made denser than the CFRP layer 74 in order to protect the CFRP layer 74.

In the present embodiment, the gas diffusion layer 73 is formed so as to cover the entire surface of the liner 10. The gas diffusion layer 73 of the present embodiment is formed using a nonwoven fabric. Examples of a material forming the nonwoven fabric include thermoplastic resins such as polyester, polyethylene, polypropylene, and nylon, thermosetting resins such as polyurethane and polyimide, and glass. The material forming the nonwoven fabric may be any material as long as it has heat resistance, chemical resistance, and strength that are sufficient as a constituent material of the reinforcing layer 70 and is stable in an environment where it is placed as the gas diffusion layer 73 in the high-pressure gas tank 100. The gas diffusion layer 73 is also referred to as an "intermediate layer."

The resin layer 71 is made of the same kind of resin as the second resin forming the GFRP layer 72. As described later, the resin layer 71 is formed as the molten or softened second resin exudes to the surface of the GFRP layer 72 when the second resin forming the GFRP layer 72 is cured during production of the high-pressure gas tank 100. Like the GFRP layer 72, a main function of the resin layer 71 is to protect the inside of the high-pressure gas tank 100 from physical or chemical stimuli that are applied from the outside to the surface of the high-pressure gas tank 100.

(A-2) Method for Producing High-Pressure Gas Tank

Figure 3:
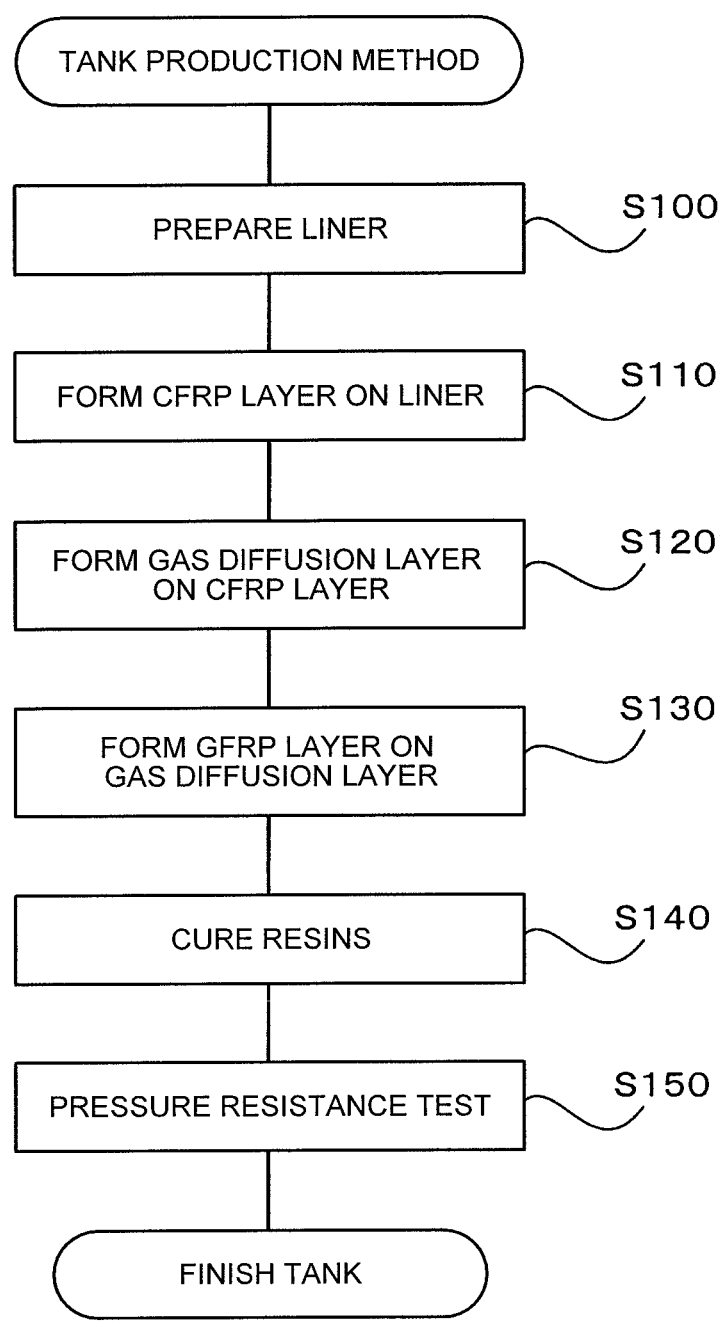
FIG. 3 is a flowchart illustrating the outline of a method for producing the high-pressure gas tank.

FIG. 3 is a flowchart illustrating the outline of a method for producing the high-pressure gas tank 100. When producing the high-pressure gas tank 100, the liner 10 is first prepared (step S100). Next, the CFRP layer 74 is formed on the prepared liner 10 using carbon fibers impregnated with resin (step S110). That is, the carbon fibers impregnated with the first resin are wound around the liner 10 by the FW process. The gas diffusion layer 73 is then formed on the CFRP layer 74 (step S120). In the present embodiment, the gas diffusion layer 73 is formed using a polyester nonwoven fabric. Specifically, the gas diffusion layer 73 is formed by tightly wrapping a polyester nonwoven fabric strip around the liner 10 having the CFRP layer 74 thereon such that there is no gap between the polyester nonwoven fabric strip and the liner 10. Thereafter, the GFRP layer 72 is formed on the gas diffusion layer 73 (step S130). That is, glass fibers impregnated with the second resin are wound around the liner 10 having the gas diffusion layer 73 formed thereon by the FW process. Subsequently, the resins forming the CFRP layer 74 and the GFRP layer 72 are cured (step S140). The resins can be cured by, e.g., heating using a heating furnace or induction heating using an induction heating coil that induces high frequency induction heating. In the curing process of step S140, the molten or softened first and second resins enter a part of the pores in the nonwoven fabric forming the gas diffusion layer 73. In the curing process of step S140, the second resin exudes to the surface of the GFRP layer 72 to form the resin layer 71. A tank obtained by the curing process of step S140 is also referred to as a pre-tank.

After step S140, a pressure resistance test is performed on the pre-tank obtained in step S140 (step S150). The high-pressure gas tank 100 is thus finished. The pressure resistance test of step S150 is a test in which the pre-tank is filled with a fluid having a predetermined test pressure and is thus pressurized to confirm that the high-pressure gas tank 100 withstands the test pressure. The test pressure is set to a pressure higher than a predetermined maximum operating pressure of the high-pressure gas tank 100. In the present embodiment, the maximum operating pressure of the high-pressure gas tank 100 is set to 70 MPa, and the test pressure is set to 105 MPa. The fluid that fills the pre-tank in the pressure resistance test is water. The test pressure can be set to any value that is sufficiently higher than the maximum operating pressure, and the test pressure is set as appropriate according to the pressure resistance required for the high-pressure gas tank 100 etc. The fluid that fills the pre-tank in the pressure resistance test is selected as appropriate so that the fluid can be easily removed from the tank when filling the finished high-pressure gas tank 100 with a gas (hydrogen in the present embodiment) to be stored in the high-pressure gas tank 100 and contamination of the gas that fills the high-pressure gas tank 100 by the fluid can be restrained.

Figure 4:
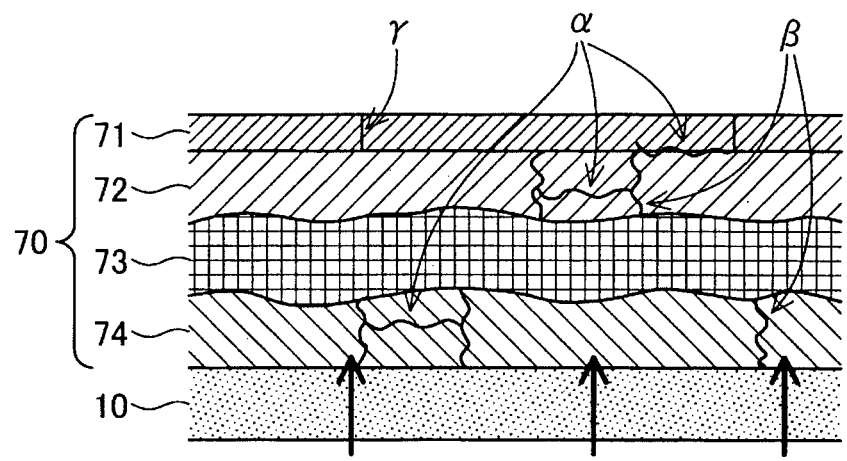
FIG. 4 is a partial enlarged schematic section of the outer wall of the high-pressure gas tank.

FIG. 4 is a partial enlarged schematic section of the outer wall of the high-pressure gas tank 100 finished through the pressure resistance test of step S150. In the pressure resistance test of step S150, the pre-tank expands as it is filled with the high-pressure fluid, and fine cracks etc. appear in the reinforcing layer 70 due to the expansion of the pre-tank. FIG. 4 shows cracks etc. that appear in the pressure resistance test of step S150. As shown in FIG. 4, for example, delaminations α, intra-layer cracks β, and resin cracks γ appear as the cracks etc. in the reinforcing layer 70 due to the expansion of the pre-tank in the pressure resistance test.

The delaminations a refer to cracks that appear between layers stacked in a direction perpendicular to the surface of the liner 10. That is, the delaminations a are cracks that develop in the plane direction. For example, the delaminations a occur between the GFRP layer 72 and the resin layer 71. In the case where the GFRP layer 72 or the CFRP layer 74 is formed by stacking a plurality of layers, the delaminations α occur between the layers of the GFRP layer 72 or the CFRP layer 74 in the GFRP layer 72 or the CFRP layer 74.

The intra-layer cracks β are cracks that develop in a direction perpendicular to the plane direction (hereinafter sometimes referred to as the stacking direction) in the GFRP layer 72 or the CFRP layer 74. The GFRP layer 72 has intra-layer cracks β that develop in the stacking direction from its surface facing the gas diffusion layer 73 to its surface facing the resin layer 71 and extend through the GFRP layer 72 in the stacking direction. The CFRP layer 74 has intra-layer cracks β that develop in the stacking direction from its surface facing the liner 10 to its surface facing the gas diffusion layer 73 and extend through the CFRP layer 74 in the stacking direction.

The resin cracks γ are cracks that develop in the stacking direction in the resin layer 71. Since these cracks that appear in the pressure resistance test are very small, their influence on the strength of the high-pressure gas tank 100 can be ignored. In the case where the influence of the cracks etc. on the strength of the high-pressure gas tank 100 cannot be ignored, the thickness etc. of the CFRP layer 74 etc. is set in advance so that the high-pressure gas tank 100 has desired strength. These fine cracks allow hydrogen in the high-pressure gas tank 100 which has passed through the liner 10 to flow out of the high-pressure gas tank 100 therethrough. In FIG. 4, arrows indicate how hydrogen passes through the liner 10. After the pre-tank is pressurized in step S150, the resin layer 71, the GFRP layer 72 and the CFRP layer 74 have increased gas permeability due to cracks etc. that appear as described above. Even after the pressurization of the pre-tank, the gas diffusion layer 73 has higher gas permeability than the CFRP layer 74 and the GFRP layer 72.

(A-3) Gas Diffusion Rate

As described above, the high-pressure gas tank 100 of the present embodiment includes the gas diffusion layer 73, and the gas diffusion layer 73 has higher gas permeability than the CFRP layer 74 and the GFRP layer 72. Since the high-pressure gas tank 100 includes such a gas diffusion layer 73, hydrogen having passed through the liner 10 and moved in the CFRP layer 74 can be diffused in the gas diffusion layer 73. As described above, the gas diffusion layer 73 of the present embodiment has a higher gas diffusion rate in the plane direction than the CFRP layer 74 and the GFRP layer 72, and the gas diffusion rate in the plane direction of the gas diffusion layer 73 is 100 Pa/s or higher. A method for measuring the gas diffusion rate in the plane direction of each of the layers forming the reinforcing layer 70 of the high-pressure gas tank 100 will be described below.

Figure 5:
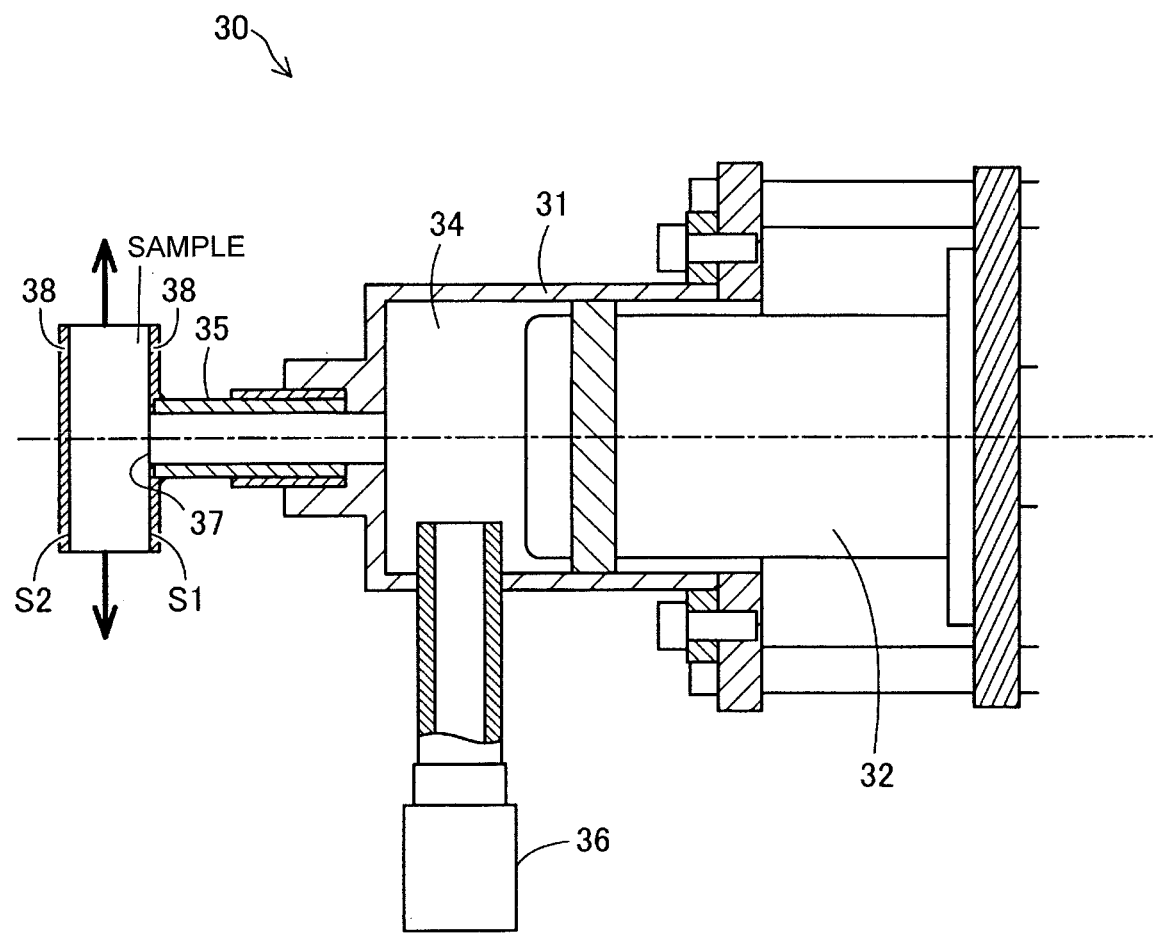
FIG. 5 is a sectional view illustrating a schematic configuration of a measuring unit for measuring a gas diffusion rate.
Figure 6:
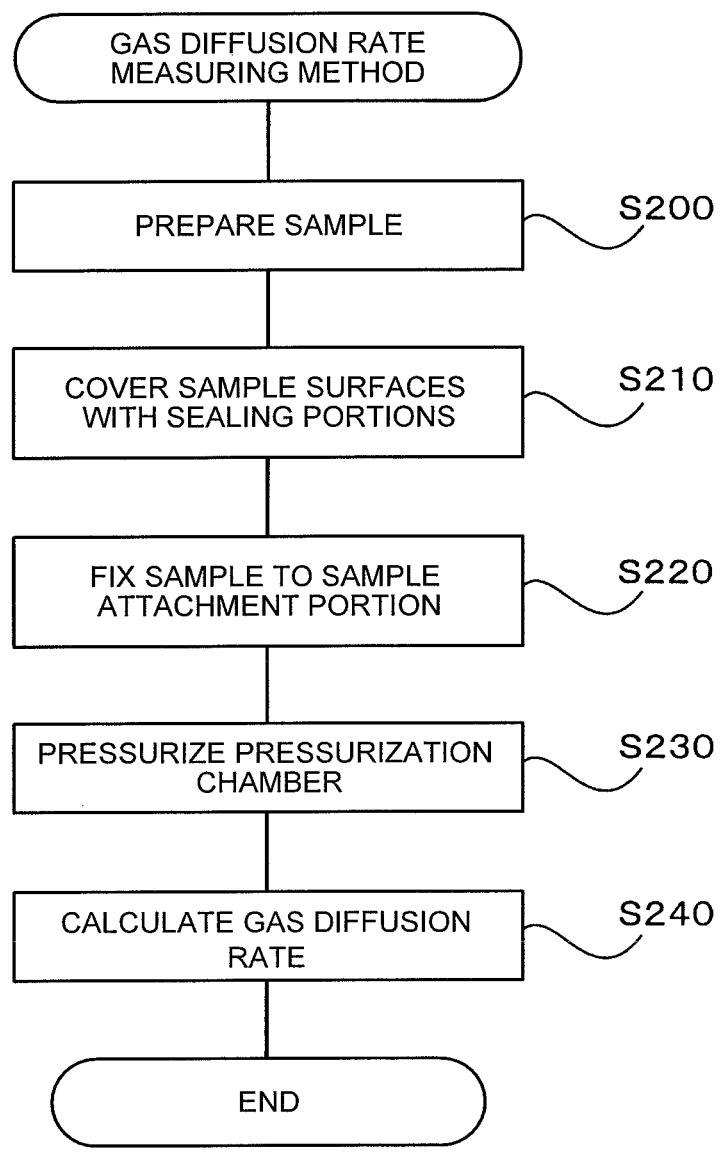
FIG. 6 is a flowchart illustrating the outline of a method for measuring the gas diffusion rate.

FIG. 5 is a sectional view illustrating a schematic configuration of a measuring unit 30 for measuring the gas diffusion rate, and FIG. 6 is a flowchart illustrating the outline of the method for measuring the gas diffusion rate. As shown in FIG. 5, the measuring unit 30 includes an outer cylinder portion 31 and a plunger portion 32, and a pressurization chamber 34 is formed in the outer cylinder portion 31. The pressurization chamber 34 is pressurized by pressing the plunger portion 32. A pressure sensor 36 is mounted in a part of the measuring unit 30 which communicates with the pressurization chamber 34, so that the pressure sensor 36 can detect the pressure in the pressurization chamber 34. A connector 35 to which a sample is attached is attached to the outer cylinder portion 31. The connector 35 has in its tip end an opening 37 communicating with the pressurization chamber 34. When measuring the gas diffusion rate of a sample, the sample is attached to the connector 35 so as to close the opening 37. An on-off valve, not shown, is disposed in an outlet portion of the pressurization chamber 34, namely a connection portion of the pressurization chamber 34 with the connector 35. In the present embodiment, the capacity of the pressurization chamber 34 is 50 cm$^3$. The capacity of the pressurization chamber 34 includes the space that allows the pressurization chamber 34 and the pressure sensor 36 to communicate with each other. In the present embodiment, the capacity of the space from the on-off valve in the outlet portion of the pressurization chamber 34 to the location where the sample is attached, that is, the space in the connector 35, is small enough to be ignored as compared to the capacity of the pressurization chamber 34.

When measuring the gas diffusion rate in the plane direction of each of the layers forming the reinforcing layer 70, a sample to be used for measurement is first prepared (step S200). The sample is prepared as follows. First, the outer wall of the high-pressure gas tank 100 is cut in the stacking direction to cut out a part of the outer wall. Once a part of the outer wall of the high-pressure gas tank 100 is cut out, the liner 10 and the reinforcing layer 70 in the cutout piece of the outer wall can be easily separated from each other. Next, each of the layers forming the reinforcing layer 70 separated from the liner 10 is shaved off in order from the outer layer in the stacking direction in the high-pressure gas tank 100 to obtain a layer to be used for measurement as a sample. The sample to be used for measurement has a 20 mm by 20 mm rectangular shape.

After the sample is obtained, a pair of surfaces of the sample which are parallel in the plane direction (a first surface S1 and a second surface S2 shown in FIG. 5) are covered with sealing portions 38 (step S210). At this time, the central part of one of the pair of surfaces, namely the central part of the first surface S1, is not covered with the sealing portion 38. Namely, the first surface S1 has in its center an area not covered by the sealing portion 38. This area is a pressurization area and has a diameter of 4 mm. That is, the sealing portions 38 are formed on the first surface S1 except the pressurization area and on the second surface S2. The sealing portions 38 can be formed by, e.g., applying an adhesive to the surfaces of the sample. Examples of the adhesive include an epoxy adhesive and a silicone adhesive.

After the sealing portions 38 are formed on the surfaces of the sample, the sample is airtightly fixed to the tip end of the connector 35 with an adhesive such that the pressurization area of the first surface S1 of the sample lines up with the opening 37 located at the tip end of the connector 35 (step S220). After the sample is fixed, the plunger portion 32 of the measuring unit 30 is pushed with the on-off valve in the outlet portion of the pressurization chamber 34 being closed to pressurize the pressurization chamber 34 to 0.1 MPa (step S230). The on-off valve is then opened, and the time elapsed from the opening of the on-off valve is measured and the pressure in the pressurization chamber 34 is measured using the pressure sensor 36. When the on-off valve is opened, compressed air in the pressurization chamber 34 flows into the sample from the opening 37 located at the tip end of the connector 35 through the pressurization area of the first surface S1 of the sample. Since the sample has the sealing portions 38 on its surfaces as described above, the air having flowed into the sample flows in the plane direction in the sample and is discharged from the side surfaces of the sample to the outside of the sample. The pressure in the pressurization chamber 34 therefore decreases. Thereafter, the gas diffusion rate in the surface direction of the sample is calculated using the measured elapsed time and the measured pressure in the pressurization chamber 34 (step S240). A method for calculating the gas diffusion rate will be specifically described below.

Figure 7:
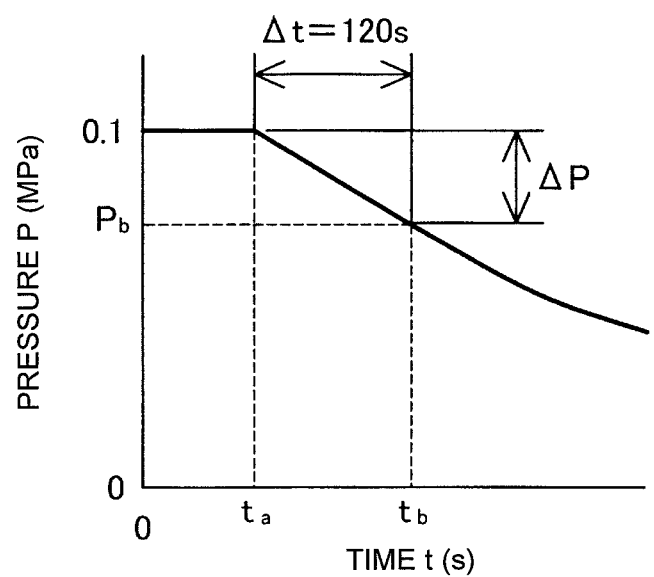
FIG. 7 is a graph illustrating how to calculate the gas diffusion rate.

FIG. 7 is a graph illustrating how to calculate the gas diffusion rate. In FIG. 7, time $t_a$ indicates the time (timing) when the on-off valve is opened after the pressure in the pressurization chamber 34 is increased to 0.1 MPa, and time $t_b$ indicates 120 seconds after the time $t_a$. During 120 seconds from time to, air passes through the sample in the plane direction, so that the pressure in the pressurization chamber 34 falls to $P_b$. In FIG. 7, "$\Delta t=120$ s" represents the elapsed time from time $t_a$ to time $t_b$, and "$\Delta P$" represents the pressure drop in the pressurization chamber 34 from 0.1 MPa to $P_b$. The gas diffusion rate in the plane direction (unit: Pa/s) is calculated as $\Delta P$ divided by $\Delta t$. That is, the gas diffusion rate refers to the pressure drop in the pressurization chamber 34 per second which is calculated from the pressure drop in the pressurization chamber 34 for 120 seconds after the gas starts to pass through the sample in the plane direction with the pressure in the pressurization chamber 34 being increased to 0.1 MPa. The more easily the gas passes through the sample in the plane direction, the more quickly the pressure in the pressurization chamber 34 falls and therefore the higher the gas diffusion rate of the sample is.

According to the high-pressure gas tank 100 of the present embodiment configured as described above, the reinforcing layer 70 includes the gas diffusion layer 73 having higher gas permeability than the CFRP layer 74 and the GFRP layer 72. With this configuration, hydrogen having passed through the liner 10 is spread in the gas diffusion layer 73, so that hydrogen is restrained from accumulating locally between the CFRP layer 74 and the GFRP layer 72 and damage to the GFRP layer 72 is restrained. According to the present embodiment, the gas diffusion layer 73 is formed on the CFRP layer 74. This configuration restrains reduction in strength of the high-pressure gas tank 100 due to the presence of the gas diffusion layer 73. These effects will further be described below.

First, how damage to the GFRP layer 72 is restrained will be described. Hydrogen having passed through the liner 10 moves in the reinforcing layer 70 toward the outer periphery of the high-pressure gas tank 100. In a high-pressure gas tank having the CFRP layer 74 on the liner side and the GFRP layer 72 on the outer peripheral side, the GFRP layer 72 serving as a protective layer is typically a dense layer having relatively low gas permeability. Therefore, in the case where the gas diffusion layer 73 is not formed between the CFRP layer 74 and the GFRP layer 72 unlike the present embodiment, hydrogen having passed through the liner 10 and then through the CFRP layer 74 tends to accumulate in the boundary between the CFRP layer 74 and the GFRP layer 72. Hydrogen does not uniformly pass through the liner 10 and hydrogen does not uniformly move in the stacking direction in the CFRP layer 74. Accordingly, the amount of hydrogen that moves in the stacking direction is not uniform in the CFRP layer 74. Namely, a larger amount of hydrogen moves in the stacking direction in some parts of the CFRP layer 74 than in other parts of the CFRP layer 74. In the parts of the CFRP layer 74 where a larger amount of hydrogen moves in the stacking direction, hydrogen is therefore more likely to accumulate in the boundary with the GFRP layer 72. As described above, the delaminations α and the intra-layer cracks β appear in the GFRP layer 72 and the resin cracks γ appear in the resin layer 71 when the pressure resistance test is conducted. Hydrogen tends to pass through these cracks etc. However, if these cracks etc. are located away from the parts of the CFRP layer 74 where a larger amount of hydrogen moves in the stacking direction, hydrogen having accumulated in the boundary between the CFRP layer 74 and the GFRP layer 72 cannot be sufficiently moved to the outside of the reinforcing layer 70.

When hydrogen locally accumulates in the boundary between the CFRP layer 74 and the GFRP layer 72, the pressure of the accumulated hydrogen increases when filling the high-pressure gas tank 100 with hydrogen in order to use the high-pressure gas tank 100. Such a pressure increase may cause damage such as rupture (tearing) in the parts of the GFRP layer 72 and the resin layer 71 where hydrogen has accumulated. Since such damage is very small and the strength of the high-pressure gas tank is mainly ensured by the CFRP layer 74, the strength of the high-pressure gas tank will not be reduced by the damage. However, abnormal noise is generated when the damage occurs to the GFRP layer 72 and the resin layer 71.

According to the present embodiment, since the gas diffusion layer 73 having high gas permeability is formed between the GFRP layer 72 and the CFRP layer 74, hydrogen having passed through the CFRP layer 74 moves in the plane direction in the gas diffusion layer 73 without accumulating locally between the CFRP layer 74 and the GFRP layer 72. Since hydrogen is thus restrained from accumulating locally between the CFRP layer 74 and the GFRP layer 72, damage to the GFRP layer 72 and the resin layer 71 and generation of abnormal noise associated with the damage are restrained. In the present embodiment, hydrogen having moved in the plane direction in the gas diffusion layer 73 not only is retained extensively in the gas diffusion layer 73 but also, when it reaches the parts of the GFRP layer 72 where the delaminations α, the intra-layer cracks β, etc. appear, is efficiently guided to the outside of the reinforcing layer 70 through these parts of the GFRP layer 72.

Next, how reduction in strength of the high-pressure gas tank 100 due to the presence of the gas diffusion layer 73 is restrained will be described.

Figure 8:
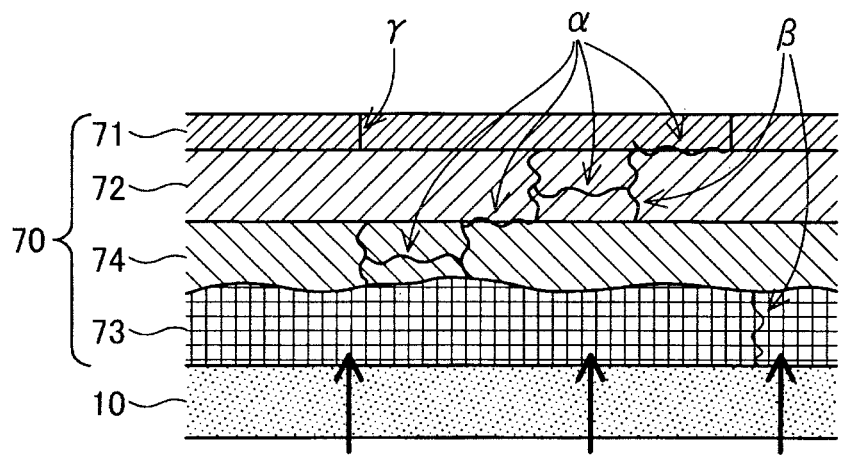
FIG. 8 is a partial enlarged schematic section of an outer wall of a high-pressure gas tank.

FIG. 8 is a schematic sectional view similar to FIG. 4, illustrating the configuration of an outer wall of a high-pressure gas tank having the gas diffusion layer 73 between the liner 10 and the CFRP layer 74 as a comparative example. Even in the case where the gas diffusion layer 73 is formed between the liner 10 and the CFRP layer 74, local accumulation of hydrogen is restrained by causing hydrogen having passed through the liner 10 to move in the plane direction in the gas diffusion layer 73. As in the embodiment, damage to the GFRP layer 72 and the resin layer 71 and generation of abnormal noise associated with the damage are therefore restrained. However, the inventors found that the strength of the high-pressure gas tank can be reduced in the case where the gas diffusion layer 73 is formed between the liner 10 and the CFRP layer 74.

Figure 9:
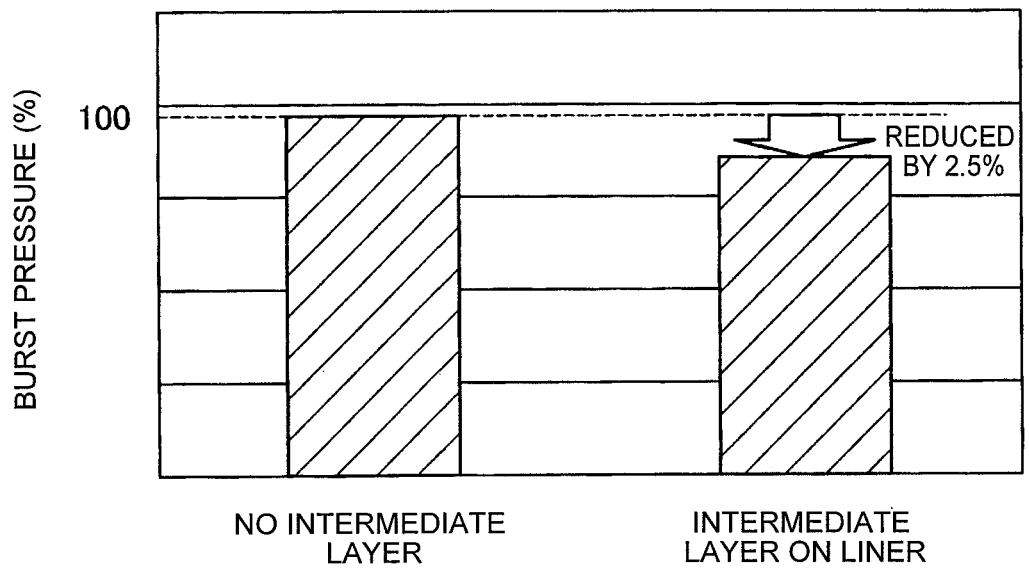
FIG. 9 is a graph illustrating the results of a burst test for the high-pressure gas tanks.

FIG. 9 is a graph schematically illustrating the results of a burst test for the high-pressure gas tanks. The burst test is a test that is conducted with a high-pressure gas tank being filled with water. In this test, the pressure of the water in the high-pressure gas tank is increased until the high-pressure gas tank bursts, and the strength of the high-pressure gas tank is evaluated based on the pressure of the water at the time the high-pressure gas tank bursts, that is, the burst pressure. FIG. 9 shows the results of the burst test performed on two types of high-pressure gas tanks, namely "no intermediate layer" and "intermediate layer on liner." "No intermediate layer" refers to a type of the high-pressure gas tank in which the reinforcing layer 70 has the CFRP layer 74, the GFRP layer 72, and the resin layer 71 shown in FIG. 2 but does not have the gas diffusion layer 73. "Intermediate layer on liner" refers to a type of the high-pressure gas tank of FIG. 8 in which the gas diffusion layer 73 is formed between the liner 10 and the CFRP layer 74.

As shown in FIG. 9, the high-pressure gas tank of the "intermediate layer on liner" type has a lower burst pressure and lower strength than the high-pressure gas tank of the "no intermediate layer" type. The results of FIG. 9 show that the burst pressure of the high-pressure gas tank of the "intermediate layer on liner" type is about 2.5% lower than that of the high-pressure gas tank of the "no intermediate layer" type. This is because, in the high-pressure gas tank of the "intermediate layer on liner" type, the CFRP layer 74 is formed on the gas diffusion layer 73 and the shape of the CFRP layer 74 is changed accordingly. That is, the gas diffusion layer 73 has a larger degree of surface unevenness than the liner 10, and the uneven shape of the surface of the gas diffusion layer 73 is reflected on the CFRP layer 74 when the CFRP layer 74 is formed on the gas diffusion layer 73. The shape of the CFRP layer 74 is therefore changed more than in the case where the CFRP layer 74 is formed on a flat surface. As a result, when the high-pressure gas tank expands during the burst test, the CFRP layer 74 is subjected to greater stress than the CFRP layer 74 formed on the liner 10 having a smooth surface. The CFRP layer 74 is a layer that mainly ensures the strength of the high-pressure gas tank. Accordingly, when the CFRP layer 74 is subjected to greater stress, the strength of the high-pressure gas tank is reduced, and the burst pressure is reduced. As described above, in the case where the gas diffusion layer 73 is formed between the liner 10 and the CFRP layer 74, hydrogen diffuses in the gas diffusion layer 73 and therefore damage to the GFRP layer 72 as described above is restrained, but the strength of the high-pressure gas tank is reduced. In this case, the CFRP layer 74 needs to be thicker etc. in order to ensure the strength of the high-pressure gas tank.

According to the high-pressure gas tank 100 of the present embodiment, the gas diffusion layer 73 is formed between the CFRP layer 74 and the GFRP layer 72. Since the CFRP layer 74 is formed on the liner 10 having a smooth surface, the shape of the CFRP layer 74 is not changed by the shape of the gas diffusion layer 73. Accordingly, such local stress that causes reduction in strength of the high-pressure gas tank 100 is restrained from being generated in the CFRP layer 74. Like the high-pressure gas tank of the "no intermediate layer" type shown in FIG. 9 in which the CFRP layer 74 is formed on the liner 10, the high-pressure gas tank 100 of the present embodiment thus has a sufficient burst pressure, and reduction in strength of the high-pressure gas tank 100 due to the presence of the gas diffusion layer 73 is restrained.

In the high-pressure gas tank of the comparative example shown in FIG. 8, the gas diffusion layer 73 is formed closer to the liner 10 than the CFRP layer 74 is. Accordingly, hydrogen spreads in the plane direction in the gas diffusion layer 73. However, when hydrogen does not uniformly pass through the CFRP layer 74, hydrogen may eventually accumulate locally between the CFRP layer 74 and the GFRP layer 72 having lower gas permeability. According to the present embodiment, the gas diffusion layer 73 is formed between the CFRP layer 74 and the GFRP layer 72. Accordingly, even when hydrogen does not uniformly pass through the CFRP layer 74, hydrogen is restrained from accumulating locally on the surface on the liner 10 side of the GFRP layer 72. Damage to the GFRP layer 72 and generation of abnormal noise associated with the damage to the GFRP layer 72 are therefore restrained.

B. Second Embodiment

Figure 10:
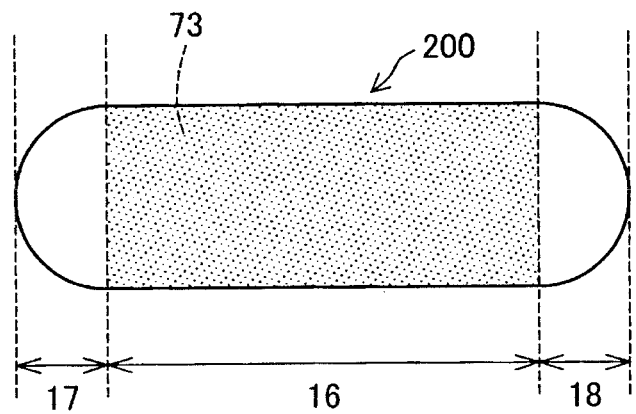
FIG. 10 is a diagram illustrating a schematic configuration of an embodiment of the high-pressure gas tank.

FIG. 10 illustrates a schematic configuration of a high-pressure gas tank 200 of a second embodiment. The high-pressure gas tank 200 of the second embodiment has a configuration similar to that of the high-pressure gas tank 100 of the first embodiment except for the area where the gas diffusion layer 73 is formed. The GFRP layer 72 formed over the dome portions 17, 18 is comprised of only a helical layer(s) and does not have any hoop layer, whereas the GFRP layer 72 formed over the cylinder portion 16 has a hoop layer at its surface. The reinforcing layer 70 formed on the dome portions 17, 18 therefore has a larger degree of surface unevenness than the reinforcing layer 70 formed on the cylinder portion 16. Accordingly, when the high-pressure gas tank expands during the pressure resistance test, the surface portion of the reinforcing layer 70 which includes the resin layer 71 and the GFRP layer 72 is subjected to greater stress over the dome portions 17, 18 than over the cylinder portion 16, and a larger number of cracks etc. appear in the surface portion of the reinforcing layer 70 over the dome portions 17, 18 than over the cylinder portion 16. In the areas where a larger number of cracks etc. appear, hydrogen having passed through the liner 10 tends to move to the outside of the high-pressure gas tank through the surface portion of the reinforcing layer 70 and therefore is less likely to accumulate locally in the boundary between the CFRP layer 74 and the GFRP layer 72. In the second embodiment, the gas diffusion layer 73 is formed between the CFRP layer 74 and the GFRP layer 72 over the cylinder portion 16, but the gas diffusion layer 73 is not formed over the dome portions 17, 18. In other words, a relatively small number of cracks etc. appear in the surface portion of the reinforcing layer 70 on the cylinder portion 16, and the gas diffusion layer 73 is formed over the cylinder portion 16. Accordingly, the above effect is achieved even when the gas diffusion layer 73 is not formed over the dome portions 17, 18. Namely, even when the gas diffusion layer 73 is not formed over the dome portions 17, 18, hydrogen is restrained from accumulating locally in the boundary between the CFRP layer 74 and the GFRP layer 72.

C. Third Embodiment

Figure 11:
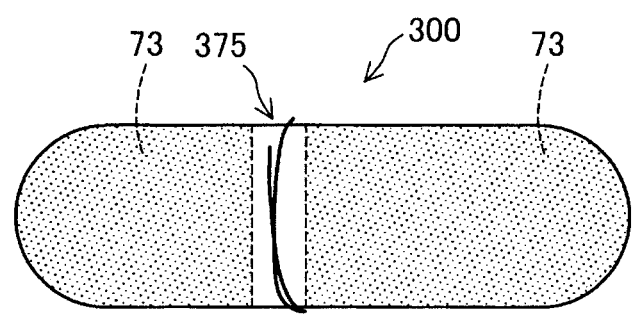
FIG. 11 is a diagram illustrating a schematic configuration of an embodiment of the high-pressure gas tank.

FIG. 11 illustrates a schematic configuration of a high-pressure gas tank 300 of a third embodiment. The high-pressure gas tank 300 of the third embodiment has a configuration similar to that of the high-pressure gas tank 100 of the first embodiment except for the area where the gas diffusion layer 73 is formed. In the high-pressure gas tank 300 of the third embodiment, the gas diffusion layer 73 is not formed in an area where a winding end 375 is formed, and the gas diffusion layer 73 is formed between the CFRP layer 74 and the GFRP layer 72 in the area other than the area where the winding end 375 is formed. The winding end 375 is the end of winding of glass fibers in the GFRP layer 72.

For example, the winding end 375 is formed by winding glass fibers impregnated with resin around the liner 10 once in the circumferential direction of the liner 10 to make the last winding and then crossing the end of the last winding under the previous winding. Alternatively, the winding end 375 may be formed by crossing the end of the last winding under a winding located at a position different from the position where the last winding is made. The operation of fixing the winding end 375 to the surface of the GFRP layer 72 can be performed by curing the resin of the winding end 375 at the surface of the GFRP layer 72. The winding end 375 may be fixed either simultaneously with or before curing of the entire reinforcing layer 70. In the third embodiment, the location where such a winding end 375 is provided is determined in advance, and in step S120, the gas diffusion layer 73 is formed in the area that does not include this location.

The reinforcing layer 70 has a larger degree of surface unevenness in the area located near the winding end 375 of the glass fiber of the GFRP layer 72 than in the other area due to the crossing of the glass fiber etc. Accordingly, when the high-pressure gas tank expands during the pressure resistance test, the surface portion of the reinforcing layer 70 which includes the resin layer 71 and the GFRP layer 72 is subjected to greater stress in the area where the winding end 375 is formed than in the other area, and a larger number of cracks etc. appear in the area where the winding end 375 is formed. In the area where a larger number of cracks etc. appear, hydrogen having passed through the liner 10 tends to move to the outside of the high-pressure gas tank through the surface portion of the reinforcing layer 70 and therefore is less likely to accumulate locally in the boundary between the CFRP layer 74 and the GFRP layer 72. In the third embodiment, the gas diffusion layer 73 is formed in the area different from the area where the winding end 375 is formed. Accordingly, the above effect is achieved even when the gas diffusion layer 73 is not formed in the area where the winding end 375 is formed. Namely, even when the gas diffusion layer 73 is not formed in the area where the winding end 375 is formed, hydrogen is restrained from accumulating locally at the interface between the CFRP layer 74 and the GFRP layer 72.

The area where the gas diffusion layer 73 is not formed may be located at a position different from the second and third embodiments as long as the number of cracks etc. (delaminations α, intra-layer cracks β, resin cracks γ, etc.) that appear in the GFRP layer 72 and the resin layer 71 during the pressure resistance test (step S150) is relatively large in the area where the gas diffusion layer 73 is not formed. For example, in the case where the gas diffusion layer 73 is formed over the cylinder portion 16 as in the second embodiment, there may be an area in the surface portion of the reinforcing layer 70 over the cylinder portion 16 where cracks etc. are likely to appear, such as the area where the winding end 375 is formed in the third embodiment. In such a case, the gas diffusion layer 73 may not be formed in this area. In each of the above embodiments, the gas diffusion layer 73 is continuous along the entire circumference of the high-pressure gas tank. However, the high-pressure gas tank of each of the above embodiments may have a different configuration. In the case where an area in the surface portion of the reinforcing layer 70 where cracks etc. are less likely to appear is not continuous along the entire circumference of the high-pressure gas tank, the gas diffusion layer 73 may be formed only in the area where cracks etc. are less likely to appear.

D. Other Embodiments

In each of the above embodiments, the gas diffusion layer 73, which is an intermediate layer, is formed using a nonwoven fabric. However, the high-pressure gas tank of each of the above embodiments may have a different configuration. Although the gas diffusion layer 73 whose gas diffusion rate in the plane direction is 100 Pa/s or higher is used in each of the above embodiments, the gas diffusion layer 73 may have a different gas diffusion rate in the plane direction. The gas diffusion layer 73 need only have higher gas permeability than the CFRP layer 74 that is a strengthening layer and the GFRP layer 72 that is a protective layer. The higher the gas permeability of the gas diffusion layer 73 and the gas diffusion rate in the plane direction of the gas diffusion layer 73 are, the more effectively the gas is restrained from accumulating between the GFRP layer 72 and the CFRP layer 74.

The gas diffusion layer 73 may be made of, e.g., foam or a fiber reinforced plastic layer (FRP layer) instead of a nonwoven fabric. When the gas diffusion layer 73 is made of the FRP layer, the gas diffusion layer 73 may be formed continuously with the CFRP layer 74 by using carbon fibers as the fibers or may be formed continuously with the GFRP layer 72 by using glass fibers as the fibers. The FRP layer as the gas diffusion layer 73 may be formed using fibers different from carbon fibers and glass fibers, such as aramid fibers. When the gas diffusion layer 73 is made of the FRP layer and carbon fibers or glass fibers are used as the fibers, the gas diffusion layer 73 and the CFRP layer 74 or the gas diffusion layer 73 and the GFRP layer 72 can be made of the same fibers, namely the same constituent material. Moreover, the same production apparatus can be used to form the gas diffusion layer 73 and the CFRP layer 74 or the GFRP layer 72. Production cost can thus be reduced.

When the gas diffusion layer 73 is made of the FRP layer, the gas permeability of the gas diffusion layer 73 can be adjusted by the type of fibers to be used, the contact angle before curing of the resin contained in the FRP layer (i.e., the adhesion strength between the cured resin and the fibers), how fibers are wound to form the FRP layer, whether or not fibers impregnated with resin are used in the process of winding the fibers to form the FRP layer, etc. For example, by reducing the adhesion strength between the cured resin and the fibers, a larger number of cracks etc. appear in the gas diffusion layer 73 during the pressure resistance test, whereby the gas permeability of the gas diffusion layer 73 can be increased. The larger the winding angle of the fibers is, namely the larger the angle between the fibers and the axial direction of the high-pressure gas tank is, and thus the closer the winding method is to hoop winding, the lower the gas diffusion rate in the plane direction of the gas diffusion layer 73 is. The larger the winding pitch of the fibers is, the higher the gas diffusion rate in the plane direction of the gas diffusion layer 73 is. Alternatively, when the fibers are wound by the FW process to form the gas diffusion layer 73, the gas permeability of the gas diffusion layer 73 can be increased by forming the gas diffusion layer 73 so that the gas diffusion layer 73 has a smaller amount of resin. For example, fibers not impregnated with resin may be wound to form the gas diffusion layer 73 so that the gas diffusion layer 73 contains only the first resin and the second resin which respectively exude from the CFRP layer 74 and the GFRP 72 during resin curing. In this case, the gas diffusion layer 73 has higher gas permeability than in the case where the gas diffusion layer 73 is formed using fibers impregnated with resin.

The disclosure is not limited to the above embodiments and can be carried out with various configurations without departing from the spirit and scope of the disclosure. For example, the technical features of the embodiments corresponding to the technical features of each aspect described in the section "SUMMARY" may be replaced or combined as appropriate in order to solve a part or all of the problems described above or to achieve a part or all of the effects described above. These technical features may be omitted as appropriate unless described as essential in the specification.

What is claimed is:

1. A high-pressure gas tank, comprising:
   a liner having an internal space for holding a gas;
   a strengthening layer stacked on the liner and having carbon fibers and a first resin;
   an intermediate layer stacked on at least a part of the strengthening layer; and
   a protective layer stacked on the intermediate layer and having glass fibers and a second resin, wherein
   the intermediate layer has higher gas permeability than the strengthening layer and the protective layer.

2. The high-pressure gas tank according to claim 1, wherein
   the liner includes a cylinder portion and a pair of hemispherical dome portions located at both ends of the cylinder portion, and
   the intermediate layer is formed over the cylinder portion.

3. The high-pressure gas tank according to claim 1, wherein
   the intermediate layer is formed along entire circumference of the high-pressure gas tank.

4. The high-pressure gas tank according to claim 1, wherein
   the intermediate layer is formed so as to cover an entire surface of the liner.

5. The high-pressure gas tank according to claim 1, wherein
   the intermediate layer is made of a nonwoven fabric or foam.

6. The high-pressure gas tank according to claim 1, wherein
   the intermediate layer is made of a fiber reinforced plastic layer.

7. The high-pressure gas tank according to claim 6, wherein
   the intermediate layer is formed continuously with the strengthening layer by using the carbon fibers or is formed continuously with the protective layer by using the glass fibers.

8. The high-pressure gas tank according to claim 1, wherein
   the intermediate layer is formed in an area other than an area where a winding end is formed, the winding end being an end of winding of the glass fibers in the protective layer.

9. The high-pressure gas tank according to claim 1, wherein
   the intermediate layer has a higher gas diffusion rate in a plane direction than the strengthening layer and the protective layer, the plane direction being a direction parallel to a surface of the liner.

10. The high-pressure gas tank according to claim 9, wherein
    the gas diffusion rate in the plane direction of the intermediate layer is 100 Pa/s or higher.

11. The high-pressure gas tank according to claim 1, further comprising:
    a resin layer formed on the protective layer, wherein
    the resin layer is made of the same kind of resin as the second resin.

12. A method for producing a high-pressure gas tank, comprising:
    preparing a liner having an internal space for holding a gas;
    forming on the liner a strengthening layer having carbon fibers and a first resin;
    forming an intermediate layer on at least a part of the strengthening layer;
    forming on the intermediate layer a protective layer having glass fibers and a second resin;
    curing the first resin of the strengthening layer and the second resin of the protective layer to form a pre-tank; and
    filling the pre-tank with a fluid having a pressure higher than a predetermined maximum operating pressure of the high-pressure gas tank to pressurize the pre-tank, and thus finishing the high-pressure gas tank, wherein
    the intermediate layer after the pressurization has higher gas permeability than the strengthening layer and the protective layer.

13. The method for producing a high-pressure gas tank according to claim 12, wherein
    the liner includes a cylinder portion and a pair of hemispherical dome portions located at both ends of the cylinder portion, and
    the intermediate layer is formed over the cylinder portion.

14. The method for producing a high-pressure gas tank according to claim 12, wherein
    the intermediate layer is formed along entire circumference of the high-pressure gas tank.

15. The method for producing a high-pressure gas tank according to claim 12, wherein
    the intermediate layer is formed so as to cover an entire surface of the liner.

16. The method for producing a high-pressure gas tank according to claim 12, further comprising:
curing the second resin to form a resin layer on the protective layer.

17. The method for producing a high-pressure gas tank according to claim 12, wherein
the intermediate layer is made of a nonwoven fabric or foam.

18. The method for producing a high-pressure gas tank according to claim 12, wherein
the intermediate layer is made of a fiber reinforced plastic layer.

19. The method for producing a high-pressure gas tank according to claim 18, wherein
the intermediate layer is formed continuously with the strengthening layer by using the carbon fibers or is formed continuously with the protective layer by using the glass fibers.

20. The method for producing a high-pressure gas tank according to claim 12, wherein
the intermediate layer is formed in an area other than an area where a winding end is formed, the winding end being an end of winding of the glass fibers in the protective layer.

* * * * *